United States Patent [19]
Taylor

[11] Patent Number: 4,672,731

[45] Date of Patent: Jun. 16, 1987

[54] FERRULE EXTRACTOR

[76] Inventor: Richard H. Taylor, 12672 Barrett La., Santa Ana, Calif. 92705

[21] Appl. No.: 920,460

[22] Filed: Oct. 20, 1986

[51] Int. Cl.[4] .............................................. B23P 19/04

[52] U.S. Cl. ...................................................... 29/259

[58] Field of Search ................. 29/256, 257, 258, 259, 29/260, 263, 266

[56] References Cited

U.S. PATENT DOCUMENTS

| | | | |
|---|---|---|---|
| 668,831 | 2/1901 | Docharty et al. | 29/259 |
| 1,383,382 | 7/1921 | Brockway | 29/260 |
| 3,076,259 | 2/1963 | Stebbins | 29/259 |

*Primary Examiner*—Robert C. Watson
*Attorney, Agent, or Firm*—Jack C. Munro

[57] ABSTRACT

An extractor for removing a ferrule which has been tightly press fitted onto a pipe. The extractor utilizes a frame within which is to be located the ferrule portion of the pipe. Within the frame, the ferrule is fixed in position with the open end of the pipe connecting with a plug. The plug is swivelly mounted onto a threaded rod. The threaded rod is threadably secured to the frame. Movement of the threaded rod causes movement of the plug against the open end of the pipe causing removing of the ferrule from the pipe.

4 Claims, 5 Drawing Figures

FERRULE EXTRACTOR

BACKGROUND OF THE INVENTION

The field of this invention relates to tools and more particularly to a tool for removing a ferrule from a pipe. Although the subject matter of the present invention has been found to be of particular advantage in extracting a ferrule from a pipe, it is considered to be within the scope of this invention to utilize the invention in other environments such as removing any type of device which is tightly mounted onto the exterior surface of a pipe.

Within the field of plumbing, it is generally preferred to use copper for water pipes within buildings, houses and other structures. The open end of the water pipe has a valve attached thereto. This valve can be manually opened or closed to control the flow of water to a source such as a sink or a toilet. There has been utilized several different types of connections to connect the pipe to the valve in a watertight manner. A common form of such a connection is known as a ferrule-type of fitting.

A ferrule type of fitting utilizes a metallic band, usually formed of brass, which is harder than the material of construction of the pipe wich is usually copper. The inside diameter of the ferrule is just slightly greater than the outside diameter of the pipe. The ferrule is inserted onto the pipe at a desired location directly adjacent the open end of the pipe. On the backside of the ferrule is located a nut which also encases the ferrule. The valve includes an externally threaded nipple which is to be threadably connected to the nut. Tightening of the nut causes a tight press fit to occur between the nipple ferrule and pipe which establishes a watertight connection.

This type of connection between the valve and the pipe will basically remain indefinitely requiring no maintenance. However, at times, valves break. If the valve is defective and needs replacement, the valve is disengaged from the nut and a new valve is to be connected to the nut replacing the old valve. However, there are several different manufacturers of valves and it seems as though each manufacturer has its own requirements as to the size of the nut or the threads per inch of the nut that are required. Therefore, it is common that when an attempt is made to install the replacement valve, that replacement valve will not connect with the nut that is mounted on the pipe.

Previous to this invention, the only reasonable course of action was to cut the pipe and install a new ferrule on the pipe and reinstall the new valve. When cutting of the pipe, there may result insufficient accessability because the pipe has been shortened. The pipe protrudes from a wall and the pipe may not now protrude far enough from the wall to reinstall a new ferrule onto the pipe. Also, once the pipe has been cut, the valve is installed at a slightly different location and it may prove difficult to reconnect the necessary outlet water line to the valve so that the water can be supplied to the source.

There is a need to construct a tool which can remove the ferrule which has been press mounted onto a pipe without causing any damage to the pipe and in essence puts the pipe back into its original form so that a new ferrule and a new nut can be installed onto the pipe in the same location as the old ferrule and then to be reconnected to a new valve.

SUMMARY OF THE INVENTION

The ferrule extractor of the present invention utilizes a substantially open frame which terminates at one end into a base and at the opposite end in a plate. Within the base is mounted a seat in the form of a recess. The width of the recess is preselected so as to permit the outside diameter of almost all sizes of water pipes to connect with the recess. The ferrule mounted on the pipe and the nut that surrounds the ferrule is then held in place against the inside surface of the base. The threaded rod is threadingly connected to the plate and has an outer end which includes a manually turnable handle with the inner end of the rod being connected to a plug. The plug is capable of rotational, as well as a limited amount of tilting, movement with respect to the rod. The plug includes a body section which is of a diameter slightly greater than the inside diameter of the pipe but is less than the outside diameter of the pipe. The plug engages with the open end of the pipe and presses thereagainst. A pressing force, applied by turning of the rod, presses the plug against the pipe and causes the pipe to be slid relative to the ferrule to eventually disengage the pipe from the ferrule.

The primary objective of the present invention is to construct a tool which permits disengagement of a ferrule from a pipe without causing destruction or damage to the pipe.

Another objective of the present invention is to construct a tool which can be manufactured inexpensively and therefore sold to the ultimate consumer at an inexpensive price.

DETAILED DESCRIPTION OF THE SHOWN EMBODIMENT

Figure 2:
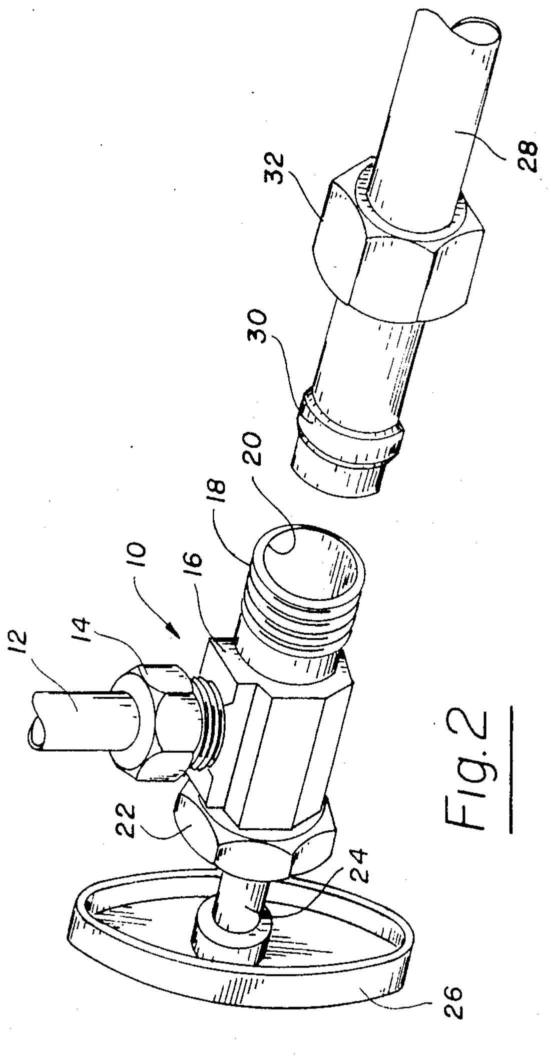
FIG. 2 is an isometric view of a typical installation of pipe and valve showing the pipe disconnected from the valve wherein the tool of the present invention can be utilized in conjunction with the pipe to remove a ferrule which has been mounted on the pipe.

Referring particularly to the drawings and noting in particular FIG. 2, there is shown valve assembly 10. This valve assembly 10 is deemed to be conventional and includes a water supply conduit 12 which is mounted by a nut 14 onto the valve housing 16. Water is to be supplied within the valve housing 16 through water supply passage 20. The exterior wall of the passage 20 includes a series of threads 18. A handle 26 is fixedly mounted onto a shaft 24 which in turn is mounted in a watertight manner by nut 22 onto the valve housng 16. It is to be understood that by manual movement of the handle 26, water can be conducted from passage 20 into water supply conduit 12 or can be prevented from being conducted into water supply conduit 12.

Water is to be conducted from a source (not shown) through conduit 28 into passage 20. In order to insure a watertight connection between the conduit 28 and the passage 20, there is placed about the exterior wall of the conduit 28, directly adjacent its open end 51, a ferrule 30. Typical material of construction for the ferrule 30 will be a brass. A common material of construction for the conduit 28 would be copper. Therefore, the ferrule 30 is harder than the conduit 28 and the conduit 28 is more malleable with respect to the ferrule 30.

Associated with the ferrule 30 is a nut 32 which is also placed about the conduit 28 and is capable of sliding in respect thereto and also capable of being rotated in respect thereto. Normally the nut 32 will engage with the threads 18 in a tight fitting manner. The outer free edge of the passage 20 abuts against the inside wall surface of the open end 51 of the conduit 28. The nut 32 presses on the outside of the ferrule 30. Slight deformation of the conduit 28 occurs which presses tightly against the ferrule 30 and against the inside of the nut 32 resulting in the creating of an extremely watertight connection therebetween. The foregoing valve and conduit assembly that has been described is deemed to be conventional and is included in almost every house and building which utilizes a supply of water to a deposit point such as a toilet or a sink.

Let it now be assumed that it is necessary to replace the valve assembly 10. The water has been turned "off" so the water will not flow through the conduit 28. This turning of the water "off" is accomplished from a valve downstream and not shown with respect to the conduit 28. The nut 32 is disengaged from the threaded section 18. Also, the nut 14 is disengaged from the valve housing 16 which then will permit the valve housing to fall free to be then replaced by a new valve housing (not shown). It has been now determined that it will be necessary to remove the nut 32 so that a new type of nut 32 (not shown) will be required to be placed on the conduit 28.

In order to achieve this nut 32 replacement without requiring the cutting of the conduit 28, there is utilized the tool 36 of this invention. The conduit 28 is conducted through a wall 37 of a building or house with a flange 34 being utilized around the conduit 28 to close the opening that has been formed within the wall 37 about the conduit 28.

The tool 36 is formed of a frame which is constructed of a base 38 within which is formed a seat comprising an enlarged recess 40. Fixedly attached to the inside surface of the base 38 are a pair of spaced apart parallel rods 42 and 44. The outer ends of the rods 42 and 44 are fixedly mounted onto a plate 46. Formed within the plate 46 is a threaded hole 48. This threaded hole 48 is located between the rods 42 and 44. Threadably engaged with the threaded hole 48 is a threaded rod 50. One end of the threaded rod 50 has an annular groove 58. Mounted about the groove 58 is a collar 52 with the end of the threaded rod 50 being located within chamber 62 of the collar 52. A pin 56 is fixedly mounted within a hole 60. Within the collar 52, a portion of the pin 56 comes to rest within the annular groove 58. Collar 52 is capable of being rotated relative to rod 50 but is lineally fixed in movement in respect thereto. Integrally attached to the collar 52 and extending outwardly therefrom is a plug 54. The function of this plug will be explained further on in this specification. The outer end of the rod 50 includes a hole 64. Mounted within the hole 64 is a handle member 66. This handle member 66 is to facilitate manual rotation of the rod 50.

Figure 5:
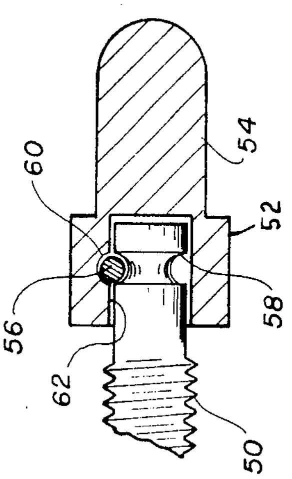
FIG. 5 is a cross-sectional view through a portion of the tool of the present invention taken along line 5—5 of FIG. 4.
Figure 1:
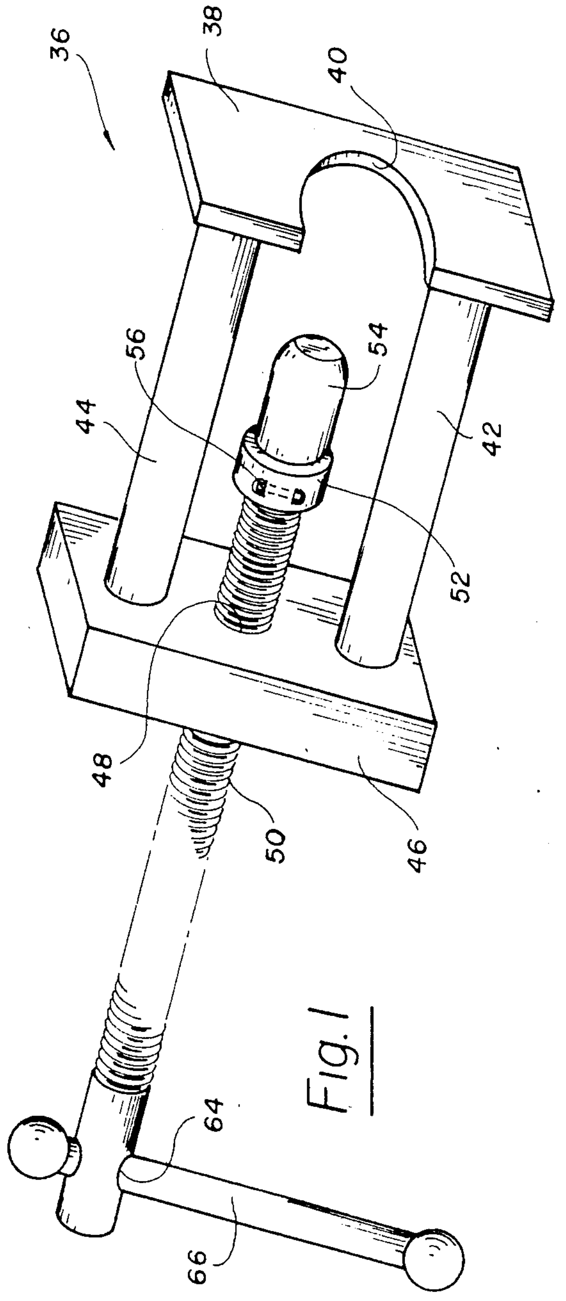
FIG. 1 is an isometric view of the ferrule extractor of the present invention.

Because of the loose type of connection established between the collar 52 and the rod 50, not only is the plug 54 capable of being freely rotated with respect to the rod 50 but also there is a slight amount of tilting movement being permitted. This loose type of connection is due to the diameter of the rod 50 being somewhat less than the diameter of chamber 60 (as shown in FIG. 5). This tilting movement is to constitute a self-alignment feature so that, when the plug 54 is located within the open end 51 of the conduit 28, the plug 54 will assume an axial alignment with the conduit 28. It is to be noted that the diameter of the plug 54 is just slightly greater than the inside diameter of the conduit 28 but is actually less than the outside diameter of the conduit 28. The reason for this is that, when the ferrule 30 is removed from the conduit 28, it will slide directly onto the plug 54.

Figures 3, 4:
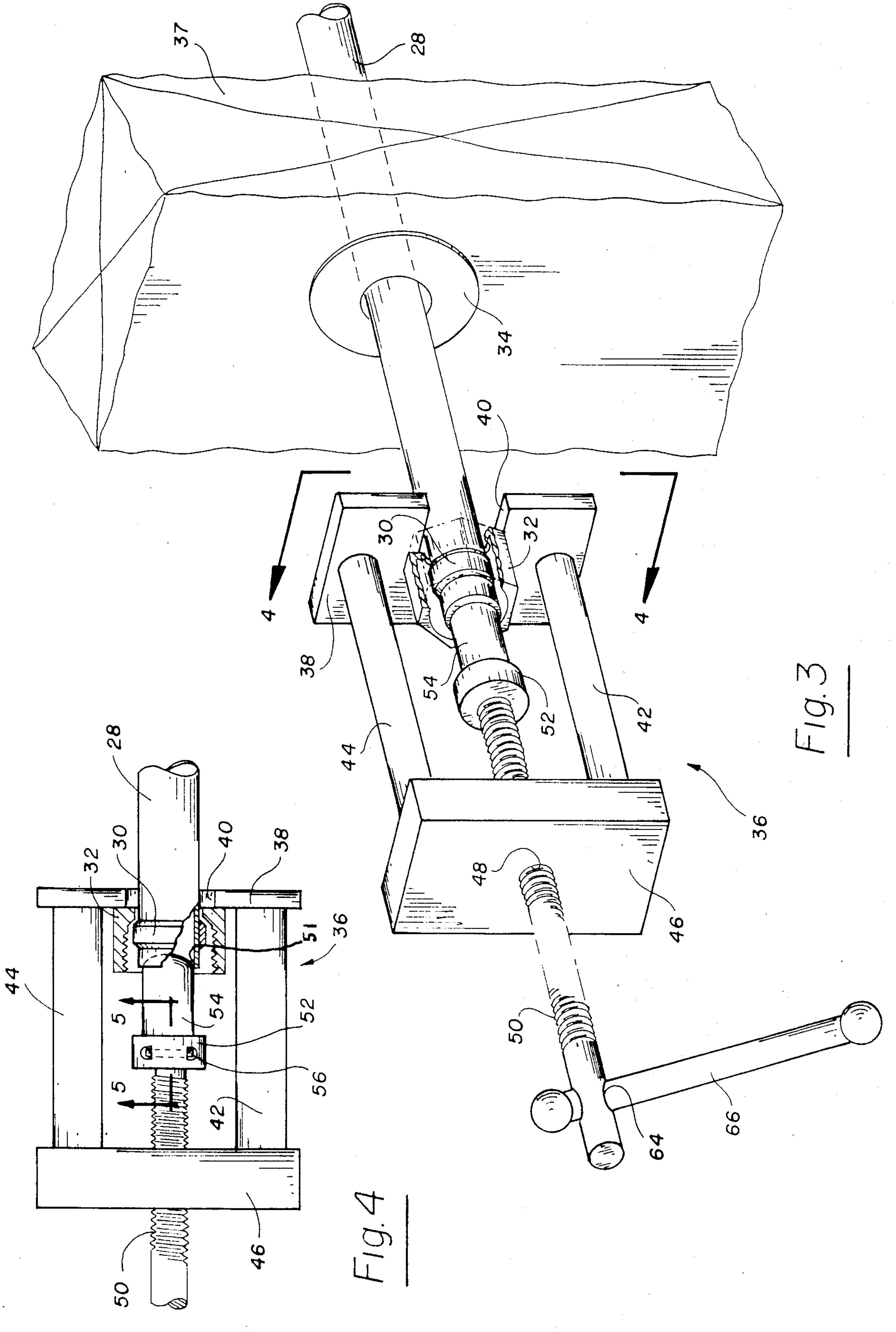
FIG. 3 is an isometric view showing the tool of the present invention being utilized to extract the ferrule which has been press fitted onto a pipe.
FIG. 4 is a side view elevational view, partly in cross-section, of the tool of the present invention showing the tool in use to remove the ferrule from the pipe.

With the plug 54 in the position shown in FIG. 4 of the drawings. Rotative movement of the rod 50 will cause the conduit 28 to be moved and slid relative to the ferrule 30. This sliding movement is permitted because the ferrule 30 is fixedly held in position against the nut 32 which in turn is pressed against the inside surface of the base 38. When the ferrule 30 has been completely removed, the rod 50 is reversably rotated until the nut 32 and the conduit 28 can be removed from the recess 40 which will then permit the nut 32 to be completely disengaged from the conduit 28. The ferrule 30 is then removed from plug 54. At this particular time a new ferrule 30 (or even the old ferrule 30) is to be installed on the conduit 28 as also a new nut 32 to facilitate connection to a new valve assembly similar to valve assembly 16.

What is claimed is:

1. A ferrule extractor for removing a ferrule from a pipe comprising:
   - a frame, said frame having a base and a plate;
   - support means fixedly secured to said plate and said base locating said base spaced from said plate;
   - seat means mounted on said base, said seat means adapted to connect with the ferrule for fixedly positioning the ferrule against said base;
   - a rod mounted on said plate, said rod being movable relative to said plate, said rod having an inner end and an outer end, said inner end located interiorly of said base between said base and said plate, said outer end being spaced exteriorly of said base;
   - a plug mounted on said inner end of said rod, said plug adapted to press against the pipe, by moving of said rod the ferrule is caused to be removed from the pipe;
   - said plug having a body section, said body section having a cross-sectional configuration matching the inner diameter of the pipe with the cross-sectional configuration of said body section being slightly larger than the inside diameter of the pipe but smaller than the outer diameter of the pipe; and
   - said plug having a substantially enclosed chamber, one end of said rod being located within said chamber and assuming a loose fit within said chamber, said plug being rotatably mounted on said rod, said plug being capable of being tilted a limited amount relative to said rod due to said loose fit between said rod and said chamber.

2. The ferrule extractor as defined in claim 1 wherein:

said seat means comprising a recess formed within said base, the size of said recess being preselected to just be slightly larger than the outer diameter of the pipe.

3. The ferrule extractor as defined in claim 2 wherein: said rod being threaded, said plate including a threaded opening, said rod engaging with said threaded opening to be threadingly movable relative to said plate.

4. The ferrule extractor as defined in claim 3 wherein: a handle attached to said outer end of said rod, said handle facilitating manual rotational movement of said rod.

* * * * *